US011493617B2

(12) United States Patent  
Weissenmayer et al.

(10) Patent No.: US 11,493,617 B2  
(45) Date of Patent: Nov. 8, 2022

(54) METHOD AND DEVICE FOR DETECTING A NOISE GENERATED IN A RECEIVE SIGNAL OF AN ULTRASONIC SENSOR

(71) Applicant: Robert Bosch GmbH, Stuttgart (DE)

(72) Inventors: Simon Weissenmayer, Flein (DE); Michael Schumann, Stuttgart (DE); Timo Koenig, Unterheinriet (DE); Christian Beer, Obersulm (DE); Philipp Sauer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/049,835

(22) PCT Filed: Apr. 25, 2019

(86) PCT No.: PCT/EP2019/060630  
§ 371 (c)(1),  
(2) Date: Oct. 22, 2020

(87) PCT Pub. No.: WO2019/211165  
PCT Pub. Date: Nov. 7, 2019

(65) Prior Publication Data  
US 2021/0255296 A1 Aug. 19, 2021

(30) Foreign Application Priority Data

May 2, 2018 (DE) .......................... 102018206700.7

(51) Int. Cl.  
*G01S 15/52* (2006.01)  
*G01S 15/60* (2006.01)  
(Continued)

(52) U.S. Cl.  
CPC .............. *G01S 7/527* (2013.01); *G01S 7/539* (2013.01); *G01S 15/52* (2013.01); *G01S 15/60* (2013.01); *G01S 15/931* (2013.01)

(58) Field of Classification Search  
CPC .......... G01S 7/527; G01S 7/539; G01S 15/52; G01S 15/60; G01S 15/931  
(Continued)

(56) References Cited

U.S. PATENT DOCUMENTS 5,491,670 A * 2/1996 Weber .................. G05D 1/0255  
367/128  
2011/0267924 A1 * 11/2011 Horsky ................. G01S 15/325  
367/99

FOREIGN PATENT DOCUMENTS

DE 10322617 A1 12/2004  
DE 102011007777 A1 10/2012  
(Continued)

OTHER PUBLICATIONS

Translation into English of Abstractor Schliep et al., DE10322617, 1 page (Year: 2021).*

(Continued)

*Primary Examiner* — Daniel L Murphy  
(74) *Attorney, Agent, or Firm* — Norton Rose Fulbright US LLP; Gerard Messina

(57) ABSTRACT

A method for recognizing a noise represented in a receive signal of an ultrasonic sensor. A characteristic spectrum of the noise is compared with a noise spectrum of the receive signal, the noise spectrum including at least two noise levels determined in different frequency bands of the receive signal.

13 Claims, 1 Drawing Sheet

(51) Int. Cl.
    *G01S 15/931*     (2020.01)
    *G01S 7/527*     (2006.01)
    *G01S 7/539*     (2006.01)

(58) Field of Classification Search
    USPC .......................................................... 367/98
    See application file for complete search history.

(56) References Cited

FOREIGN PATENT DOCUMENTS

| DE | 102011087839 A1 | 6/2013 |
|----|-----------------|--------|
| EP | 0473835 A1 | 3/1992 |

OTHER PUBLICATIONS

Translation into English of Description of Schliep et al., DE10322617, 42 pages (Year: 2021).*
International Search Report for PCT/EP2019/060630, dated Jul. 22, 2019.

* cited by examiner

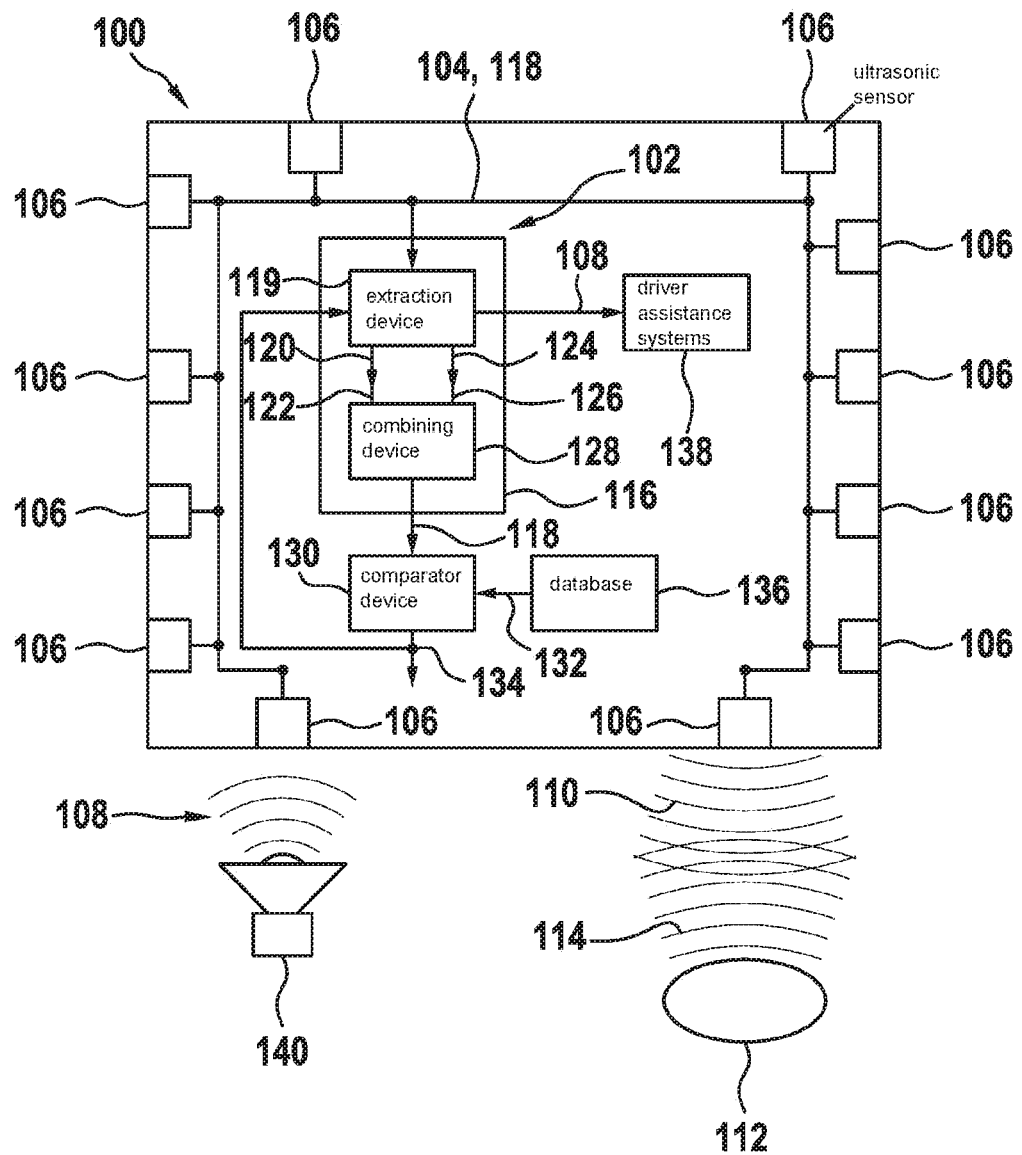

METHOD AND DEVICE FOR DETECTING A NOISE GENERATED IN A RECEIVE SIGNAL OF AN ULTRASONIC SENSOR

FIELD

The present invention relates to a method and to a device for recognizing a noise represented in a receive signal of an ultrasonic sensor.

BACKGROUND INFORMATION

An ultrasonic sensor emits ultrasound. After the emission, the ultrasonic sensor is capable of receiving during a receive window, and records reflected echoes and foreign noises in a receive signal. At the end of the receive window, an intensity of the foreign noises is acquired and is represented in a noise level.

SUMMARY

The present invention provides a method for recognizing a noise represented in a receive signal of an ultrasonic sensor, and a device for recognizing a noise represented in a receive signal of an ultrasonic sensor, as well as, finally, a corresponding computer program product and a machine-readable storage medium.

Advantageous developments and improvements of the present invention result from the description herein.

Specific embodiments of the present invention can advantageously make it possible to evaluate foreign noises using an ultrasonic sensor, and to distinguish different noise sources of the foreign noises on the basis of a composition of the noise produced by the sources.

A method is presented for recognizing a noise represented in a receive signal of an ultrasonic sensor that is characterized in that a characteristic spectrum of the noise is compared with a noise spectrum of the receive signal, the noise spectrum including at least two noise levels determined in different frequency bands of the receive signal.

Specific embodiments of the present invention can be regarded as based on, inter alia, the concepts and findings described below.

An ultrasonic sensor can emit ultrasonic waves by exciting a boundary surface of the ultrasonic sensor to the surrounding environment to oscillation, using an electrical transmit signal. The boundary surface can be excited to oscillations by impinging sound waves. The impinging sound waves can be a superposition of echoes of the emitted ultrasonic waves with noises from a surrounding environment. The oscillations are converted into an electrical receive signal by the ultrasonic sensor. The receive signal can be acquired as a time record of the oscillations. The receive signal is recorded for a time duration of a predetermined receive window. The ultrasonic sensor can also provide a receive signal in the case in which no ultrasonic waves have been emitted. In that case, the receive signal represents only the noises from the surrounding environment. The ultrasonic sensor can be installed in particular in a vehicle. The approach presented here can be realized both when the vehicle is at a standstill and when it is traveling.

A "characteristic spectrum" can be understood as a frequency spectrum of an exemplarily analyzed noise. Different noises may have different frequency spectra. A first noise can have a different frequency distribution than does a second noise. The characteristic spectrum can be specific for a vehicle type and a location of installation of the ultrasonic sensor in the vehicle. The characteristic spectrum can also be trained in sensor-individual fashion.

A "noise spectrum" can be understood as a frequency spectrum of a noise of the receive signal. The recorded noises are represented in the noise. A frequency band of the noise spectrum can include frequencies between a lower boundary frequency of the frequency band and an upper boundary frequency of the frequency band. The frequency bands can partly overlap, can be immediately adjacent to one another, or can be separated from one another by a frequency gap. The noise spectrum can include more than two frequency bands.

The second noise level can be determined in time-offset fashion relative to the first noise level. Here, the frequency bands can be evaluated one after the other. The ultrasonic sensor can be calibrated to the frequency band of the second noise level after the acquisition of the first noise level. In this way, an ultrasonic sensor having a low receive bandwidth can also be used. Through the time-offset determination of the noise levels, resources can be saved.

The noise spectrum can be compared with a plurality of different spectra of different noises in order to recognize the noise. The different spectra can be stored in a database that is accessed for the comparison. Through the different spectra, different noises can be distinguished. The comparison can be carried out using pattern recognition.

A relative speed between a source of the noise and the ultrasonic sensor can be determined using a Doppler shift of the noise spectrum relative to the characteristic spectrum. The vehicle can move relative to its surrounding environment with a relative speed, and other vehicles can move with a different relative speed relative to the vehicle. Due to the relative speed, all frequencies of the noise shift in one direction and by the same amount. In this way, frequency bands of the acquired noise spectrum also shift. By taking the Doppler shift into account, for example stationary noise sources can be distinguished from moving noise sources.

A superposition of at least one additional noise on a noise can be recognized by comparing the noise spectrum with at least one further characteristic spectrum. The superposition results in reinforcements and attenuations of particular frequencies. The characteristic spectra can be combined in order to recognize the superposed noises. The individual noises can be acquired separately if one of the noises changes relative to the other noise, because in this case a change in the noise spectrum occurs.

In addition, a further noise spectrum, determined in time-offset fashion, can be compared with the characteristic spectrum in order to recognize the noise. The comparison can be carried out multiple times in order to obtain increased reliability. If the noise spectrum is produced by a plurality of noises, then a change in the noise spectrum can occur between the times of acquisition. In this way, the different noises can be resolved.

As characteristic spectrum, a travel wind spectrum of a travel wind noise can be compared with the noise spectrum in order to recognize the noise. A travel wind noise arises at the vehicle due to air turbulence at the vehicle. The noise source can in this case be situated very close to the ultrasonic sensor. The travel wind noise has a large portion of high frequencies. If the travel wind noise occurs very close to the sensor, the high frequencies of the travel wind noise are not attenuated, or are attenuated only very slightly, in the distance between the noise source and the ultrasonic sensor.

As characteristic spectra, different road condition spectra from different road condition noises can be compared with the noise spectrum in order to recognize the noise. Road condition noises are produced by the rolling of the wheels of the vehicle on the roadway. The road condition noise changes as a function of whether the roadway is wet or dry, smooth or rough, or a combination thereof. The road condition noise includes high frequencies and low frequencies.

The noise source of the road condition noise is situated at a distance from the ultrasonic sensor differing from the distance of the noise source of the travel wind noise. As a result, the frequencies are attenuated to different degrees.

As characteristic spectra, different foreign vehicle spectra of different foreign vehicles can be compared with the noise spectrum in order to recognize the noise. Travel wind noises and road condition noises that are superposed on one another arise at foreign vehicles. Foreign vehicles are further away from the ultrasonic sensor than is the noise source of the road condition noise of the home vehicle. As a result, the high frequencies are more strongly attenuated than are the low frequencies.

The example method in accordance with the present invention can be implemented in software or hardware, or in a mixed form of software and hardware, for example in a control device.

In addition, the present invention provides a device that is designed to carry out, control, or realize the steps of a variant of the method presented here in corresponding devices.

The device can be an electrical apparatus having at least one computing unit for processing signals or data, at least one storage unit for storing signals or data, and at least one interface and/or a communication interface for reading in or outputting data that are embedded in a communication protocol. The computing unit can be for example a signal processor, a so-called system ASIC, or a microcontroller for processing sensor signals and outputting data signals as a function of the sensor signals. The storage unit can be for example a flash memory, an EPROM, or a magnetic storage unit. The interface can be realized as a sensor interface for reading in the sensor signals from a sensor and/or as an actuator interface for outputting the data signals and/or control signals to an actuator. The communication interface can be designed to read in or to output the data in wireless fashion and/or in wire-bound fashion. The interfaces can also be software modules present for example on a microcontroller alongside other software modules.

In accordance with an example embodiment of the present invention, also advantageous is a computer program product, or computer program, having program code that can be stored on a machine-readable carrier or storage medium such as a semiconductor memory, a hard drive, or an optical memory, and is used to carry out, implement, and/or control the steps of the method according to one of the specific embodiments described above, in particular when the program product or program is executed on a computer or a device.

It is to be noted that some of the possible features and advantages of the present invention are described herein with reference to various specific embodiments. The person skilled in the art will recognize that the features of the method and of the device can be combined, adapted, or exchanged in a suitable manner in order to arrive at further specific embodiments of the present invention.

BRIEF DESCRIPTION OF THE DRAWING

Below, specific embodiments of the present invention are described with reference to the FIGURE; neither the FIGURE nor the description herein are to be interpreted as limiting the present invention.

FIG. 1 shows a representation of a vehicle having a device according to an exemplary embodiment of the present invention.

The FIGURE is merely schematic, and is not to scale. Identical reference characters in the FIGURE designate identical features, or features having identical function.

DETAILED DESCRIPTION OF EXAMPLE EMBODIMENTS

FIG. 1 shows a vehicle 100 having a device 102 according to an exemplary embodiment. Device 102 is designed to carry out a method according to the approach presented here for recognizing a noise 108 represented in a receive signal 104 of an ultrasonic sensor 106. Vehicle 100 has a plurality of ultrasonic sensors/transducers 106. An ultrasonic sensor/transducer 106 is configured to convert an electrical signal into an ultrasonic signal 110 and to radiate it. In addition, ultrasonic sensor/transducer 106 is configured to represent incoming sound waves in electrical receive signal 104.

In this context, receive signal 104 maps intensity values of the incoming sound waves over time. The sound waves are made up of echoes 114, reflected by objects 112, of the previously emitted ultrasonic signal 110, and environmental noises. Echoes 114 are recorded if they arrive at ultrasonic sensor 106 within an acquisition time period after the emission of ultrasonic signal 110. Echoes 114 substantially have a frequency of the emitted ultrasonic signal 110. In the case of a moving object 112, the frequency of echo 114 can be shifted, due to the Doppler effect, by a Doppler shift relative to the emitted frequency.

In addition to echoes 114, or also if no echoes 114 are received, noises 108 are represented in receive signal 104. Noises 108 may mask weak echoes 114. Noises 108 have a multiplicity of frequencies, or a frequency spectrum. The frequency spectrum of noises 108 is at least partly represented in receive signal 104. The frequency spectrum can for example be represented only in part in receive signal 104, if at least a subregion of the frequency spectrum lies outside a receive frequency range of ultrasonic sensor 106.

In a filter device 116 of device 102, a noise spectrum 118 of receive signal 104 is filtered out from receive signal 104. For this purpose, in an extraction device 119 of filter device 116, a first frequency band 120, comprising a first frequency range, is extracted from receive signal 104, and a first noise level 122 of first frequency band 120 is determined. In addition, in extraction device 119 at least one second frequency band 124, including a second frequency range, is extracted, and a second noise level 126 of second frequency band 124 is determined. Noise levels 122, 126 each represent for example an average value of the intensity values of the frequencies of the respective frequency band 120, 124.

In a combination device 128 of filter device 116, the noise levels 122, 126 of frequency bands 120, 124 are combined to form noise spectrum 118.

Here, a resolution of noise spectrum 118 can be increased by a larger number of frequency bands 120, 124 and a smaller width of the frequency bands 120, 124.

In a comparator device 130 of device 102, noise spectrum 118 is compared with a characteristic spectrum 132 of at least one noise 108 in order to recognize noise 108. When noise 108 is recognized, an item of noise information 134 is provided.

In an exemplary embodiment of the present invention, noise spectrum 118 is compared with a multiplicity of different characteristic spectra 132 that are read out from a database 136. Here, noise spectrum 118 is compared with the characteristic spectra 132 via a pattern comparison of the different noise levels 122, 126 of the different frequency bands 120, 124 with the characteristic noise levels of the characteristic frequency bands.

In an exemplary embodiment of the present invention, noise 108, or the portions of noise 108 represented in receive signal 104, are filtered out from receive signal 104 by extraction device 119 of filter device 116, and is provided for further use for at least one driver assistance system 138 when noise information 134 is provided.

In an exemplary embodiment of the present invention, extraction device 119 can be calibrated to a respective frequency band 120, 124. The frequency bands 120, 124, with the associated noise levels 122, 126, are then extracted one after the other in short time steps. In the combining device 128, the noise spectrum 118 is combined over a plurality of time steps and is provided when all frequency bands 120, 124 contained in the noise spectrum have been extracted.

In an exemplary embodiment of the present invention, noise 108 is received at at least one ultrasonic sensor 106 with raised or lowered frequencies due to the Doppler shift resulting from a relative speed between vehicle 100 and a noise source 140 of noise 108. As a result, the noise spectrum 118 is also shifted, at least in portions, in the direction of higher or lower frequencies. An envelope through the individual noise levels 122, 126 of noise spectrum 118 is shifted by the Doppler shift relative to an envelope through the level of characteristic spectrum 132. Despite the Doppler shift, the envelopes have a very similar shape, and the comparison can be carried out in comparator 130. During the comparison, the Doppler shift is measured. From the Doppler shift, the relative speed can be calculated.

In an exemplary embodiment of the present invention, a plurality of noise spectra 118 filtered out one after the other from input signals 104 at offset times is used for the comparison with characteristic spectrum 132. If only a subregion, or a portion, of the noise levels 122, 126 is reproduced in each of the noise spectra 118, then the noise spectra 118 can be superposed in order to be compared with characteristic spectrum 132 together.

Through noise spectra 118 filtered one after the other, a change in noise spectra 118 over time can also be observed, for example if a plurality of noises 108 are represented in superposed fashion in input signal 104. There is a high probability that noises 108 from different noise sources 140 will change in different ways over time, and can in this way be distinguished from one another.

In other words, a method is presented for the optimized distinguishing of road conditions and other influences, using a spectral analysis of the ultrasonic noise levels.

Ultrasonic sensors calculate a noise level using voltage measurement values acquired at the end of a measurement window. The noise level is provided to the control device together with the recognized objects. On the basis of the noise level, the control device can estimate what the probability of an incorrectly recognized object is.

The road condition can be determined on the basis of the noise level. The influences of travel wind and of other vehicles can be distinguished from the noise level caused by the road condition.

Noise levels can be determined in different frequency bands through the selection of the frequency band.

In the approach presented here, the distinguishing between the influences of travel wind, of other vehicles, and of the road condition on the noise level is improved. As a result, the recognition function in wet conditions is improved.

Noise levels of a plurality of frequency bands are measured within a short time, or simultaneously, and the contribution of the influences of the travel wind, of other vehicles, and of the road condition is inferred by spectral analysis from the noise level differences of the different frequency bands.

Noise resulting from wind has a different characteristic spectrum than does noise resulting from tires moving on wet pavement. Electrical discharges also have their own characteristic spectrum. In order to obtain comparison spectra, spectra from possible noise sources are measured and stored ahead of time. In addition, comparison spectra of possible environmental influences, such as guardrails, other vehicles, concrete walls, or trees, are measured ahead of time and their respective characteristic spectra are stored.

In general, high frequencies are more strongly attenuated over distance than are low frequencies. In the spectrum of the noise produced further from the sensor, for example produced by other vehicles, the high frequency bands are therefore more strongly attenuated than are the low frequency bands. In the spectrum of the noise that arises directly at or in the immediate vicinity of the sensor, e.g., due to travel wind, none of the frequency bands are significantly attenuated. In the spectrum of the noise that originates in the middle distance, e.g., at the wheels due to traveling on wet pavement, tire rolling noises, or wind noises in the wheel wells of the home vehicle, the high-frequency bands are slightly more strongly attenuated than are the low frequency bands. The noise that arises due to wind or water at remote vehicles can therefore be easily distinguished from the noise sources of the home vehicle by analyzing the spectrum of the noise signal.

The characteristic spectra of noise sources that are moving relative to the sensors is shifted by the Doppler effect. The spectra of wind noise and of tires on wet pavement from other vehicles approaching or moving away from the sensor is therefore shifted in the direction of higher or, respectively, lower frequencies. Noise sources from oncoming, passed and passing vehicles, and from stationary objects, can therefore also be clearly distinguished from the noise sources of the home vehicle by analyzing the spectrum of the noise signal.

The ultrasonic sensors that are currently used for echo-location operate in the range between 43 kHz and 60 kHz; depending on the mode, only a portion of this range is used for emission, and therefore the noise is also calculated only in the respective frequency band. For this reason, after each measurement the sensors can change mode in order to measure the largest possible number of different frequency bands in the shortest time. For example, measurement can take place cyclically one after the other in the frequency bands 43 kHz to 48 kHz, 48.5 kilohertz to 53.5 kilohertz, and 52 kHz to 60 kHz.

For future sensors, a simultaneous determination of all frequency bands within a measurement window and independent of the selected mode can also be possible. For the spectral evaluation, methods such as digital bandpass filters or Fourier spectra can be used. Moreover, in further frequency bands noise levels can be measured in a targeted manner even if, or particularly if, no echoes are to be expected in these frequency bands. Thus, for example frequency bands below 43 kHz and above 60 kHz, preferably in a range from 10 kHz to 100 kHz, including in the acoustic range, can also be measured.

An evaluation above 60 kHz is particularly advantageous in order to better determine the contribution of travel wind, while an evaluation below 43 kHz is particularly advantageous for better determining disturbing noises coming from a great distance. The frequency analysis can take place here with a relatively low resolution. Individual spectral regions can be combined in bands, preferably not more than 10. Due to the limited bandwidth of ultrasound transducers, it is in addition advantageous if microphones are also used for the evaluation.

For each possible road condition (damp, wet, puddles of water, ice, slush, snow, etc.), for all weather influences (rain, (travel) wind, etc.), and for all sources of interference (automobile, motorcycle, truck, street sweeper, railway vehicle, streetlamp, etc.) the spectrum of the associated noise level is known to the vehicle. The road condition, weather influences, and disturbing sources can be superposed on one another, and as a result a very large number of different superposed spectra can be measured. An unambiguous allocation of the current situation (made up of the influences of the road condition, weather influences, and disturbing sources) is, generally, possible only with difficulty, because a plurality of situations can result in similar or identical superposed spectra. However, generally only some, or a few, influences change at the same time. Based on the previously measured superposed spectrum and the situation determined therefrom, the difference from the currently measured superposed spectrum is determined, and is assigned, as far as possible, to a single changed influence. If this is not possible, then an attempt is made to attribute the changed superposed spectrum to two or more changed influences. The classification can take place using methods such as the use of artificial neural networks, in particular a convolutional neural network. Through the evaluation of this spectrum curve relative to the vehicle position (e.g., using GPS), stationary noise sources can also be determined in the cloud through the fusion of data of a plurality of vehicles, and the functionality of the individual vehicles can be verified (diagnosed).

Road conditions, weather influences, and interfering sources can be better distinguished from one another. In addition, short, damp, wet, or flooded roadway segments can be recognized more reliably. The state of the tires, or the tread depth, can be better determined. The wind and the wind direction can be better determined. The quantity of rain can be better determined.

Finally, it is to be noted that terms such as "comprising," "including," etc., do not exclude any other elements or steps, and terms such as "one" or "a" do not exclude the presence of a plurality.

What is claimed is:

1. An apparatus for recognizing a noise represented in a receive signal of an ultrasonic sensor, comprising:
   a device configured to perform the following:
      receiving the receive signal;
      obtaining a noise spectrum of the receive signal by filtering and extracting the noise spectrum out from the receive signal using an extraction device of a filter device, wherein a first frequency band, including a first frequency range, is extracted from the receive signal, and a first noise level of the first frequency band is determined, wherein in the extraction device, at least one second frequency band, including a second frequency range, is extracted, and a second noise level of the second frequency band is determined, wherein noise levels each represent an average value of intensity values of frequencies of a respective frequency band, and wherein a combination device of the filter device combines the noise levels of the frequency bands to form the noise spectrum, and wherein a resolution of the noise spectrum is increased by a larger number of the frequency bands and a smaller width of at least one of the frequency bands with respect to at least another one of the frequency bands; and
      comparing at least one characteristic spectrum of the noise with a noise spectrum of the receive signal, the noise spectrum including at least two noise levels determined in different frequency bands of the receive signal;
   wherein a plurality of noise spectra, filtered out one after the other from input signals at offset times, is used for the comparison with a characteristic spectrum, and when only a subregion or a portion of the noise levels is reproduced in each of the noise spectra, then the noise spectra are superposed to be compared with the characteristic spectrum.

2. The apparatus as recited in claim 1, wherein the second noise level of the noise levels is determined in a time-offset manner relative to the first noise level of the noise levels.

3. The apparatus as recited in claim 1, wherein the noise spectrum is compared with a plurality of different spectra of different noises to recognize the noise.

4. The apparatus as recited in claim 3, wherein, to recognize the noise, a travel wind spectrum of a travel wind noise is compared with the noise spectrum, different road condition spectra of different road condition noises are compared with the noise spectrum, and different foreign vehicle spectra of different foreign vehicles are compared with the noise spectrum.

5. The apparatus as recited in claim 1, wherein a relative speed between a noise source of the noise and the ultrasonic sensor is determined using a Doppler shift of the noise spectrum relative to the characteristic spectrum.

6. The apparatus as recited in claim 1, wherein a superposition of at least one other noise on the noise is recognized by comparing the noise spectrum with at least one other characteristic spectrum.

7. The apparatus as recited in claim 1, wherein the noise spectra include a first noise spectrum and a second noise spectrum, the second noise spectrum being determined in a time-offset manner, is compared with the characteristic spectrum to recognize the noise.

8. The apparatus as recited in claim 1, wherein in a comparator device, the noise spectrum is compared with the characteristic spectrum of at least one noise to recognize the noise and then to provide an item of noise information.

9. The apparatus as recited in claim 1, wherein the at least one characteristic spectrum includes characteristic spectra, wherein the noise spectrum is compared with a multiplicity of different characteristic spectra from a database, and wherein the noise spectrum is compared with characteristic spectra via a pattern comparison of different noise levels of different frequency bands with the characteristic noise levels of characteristic frequency bands.

10. The apparatus as recited in claim 1, wherein at least portions of the noise in the receive signal, which are filtered out from the receive signal by the extraction device of the filter device, are provided for further use for at least one driver assistance system.

11. The apparatus as recited in claim 1, wherein the extraction device is calibrated to a respective one of the frequency bands, wherein the frequency bands, with associated noise levels, are then extracted one after the other in time steps, and wherein in a combining device, the noise spectrum is combined over a plurality of the time steps and is provided when all of the frequency bands contained in the noise spectrum have been extracted.

12. The apparatus as recited in claim 1, wherein the noise is received at at least one of ultrasonic sensors with raised or lowered frequencies due to a Doppler shift resulting from a relative speed between a vehicle and a noise source of the noise, so that the noise spectrum is also shifted, at least in portions, in a direction of higher or lower frequencies, wherein envelopes through the noise levels of the noise spectrum are shifted by the Doppler shift relative to an envelope through a level of a characteristic spectrum, so that despite the Doppler shift, the envelopes have a similar shape, and a comparison can be carried out, and during the comparison, the Doppler shift is measured, and from the Doppler shift, a relative speed is calculated.

13. The apparatus as recited in claim 1, further comprising:
    ultrasonic sensors;
    wherein the ultrasonic sensors are used for echolocation and operate in a range between 43 kHz and 60 kHz, wherein depending on a mode, only a portion of the range is used for emission, and therefore the noise is calculated only in a respective frequency band, and wherein after each measurement, and wherein the ultrasonic sensors are configured to change mode to measure a number of different frequency bands.

* * * * *